United States Patent
Fernandez

(10) Patent No.: US 10,617,275 B2
(45) Date of Patent: Apr. 14, 2020

(54) CLEANING BUCKET ASSEMBLY

(71) Applicant: Maria V. Fernandez, Miami, FL (US)

(72) Inventor: Maria V. Fernandez, Miami, FL (US)

(*) Notice: Subject to any disclaimer, the term of this patent is extended or adjusted under 35 U.S.C. 154(b) by 141 days.

(21) Appl. No.: 15/914,107

(22) Filed: Mar. 7, 2018

(65) Prior Publication Data
US 2019/0274515 A1 Sep. 12, 2019

(51) Int. Cl.
*A47L 13/50* (2006.01)
*A47L 13/58* (2006.01)
*A47L 13/52* (2006.01)

(52) U.S. Cl.
CPC .............. *A47L 13/50* (2013.01); *A47L 13/52* (2013.01); *A47L 13/58* (2013.01)

(58) Field of Classification Search
CPC .......... A47L 13/50; A47L 13/52; A47L 13/51; A47L 13/58
See application file for complete search history.

(56) References Cited

U.S. PATENT DOCUMENTS

| | | | |
|---|---|---|---|
| 2,594,176 A | 4/1952 | Kaiser, Jr. | |
| 4,161,799 A * | 7/1979 | Sorrells | A47L 13/58 15/260 |
| 4,798,307 A | 1/1989 | Evrard | |
| 6,006,397 A | 12/1999 | Williams et al. | |
| 6,260,230 B1 * | 7/2001 | Hunt | A47L 13/58 134/6 |
| 7,649,147 B2 | 1/2010 | Xiao | |
| 8,108,963 B2 * | 2/2012 | Griot | G01F 19/00 15/264 |
| 8,696,028 B2 | 4/2014 | Nelson | |
| 8,771,428 B1 | 7/2014 | Goentzel | |
| 9,474,429 B2 * | 10/2016 | Kepner | A47L 13/58 |
| 2007/0210546 A1 * | 9/2007 | Presnell | B62B 3/008 280/47.35 |
| 2008/0295870 A1 * | 12/2008 | Perelli | A47L 13/22 134/42 |
| 2011/0277259 A1 * | 11/2011 | Chen | A47L 13/20 15/228 |
| 2012/0233803 A1 * | 9/2012 | Chiang | A47L 13/58 15/260 |
| 2013/0092698 A1 * | 4/2013 | Orlandi | A47L 13/58 220/660 |
| 2015/0210429 A1 * | 7/2015 | Bensussan | A47L 13/50 220/532 |
| 2017/0369342 A1 * | 12/2017 | Hom | A46B 17/06 |

* cited by examiner

*Primary Examiner* — Michael D Jennings

(57) ABSTRACT

A cleaning bucket assembly for keeping clean water and used water separate includes a container that has a bottom wall and a peripheral wall that is attached to and extends upwardly from the bottom wall. The peripheral wall includes a forward wall, a rear wall, a first lateral wall, a second lateral wall. A dividing wall is attached to the bottom wall and extends from the forward wall to the rear wall. The dividing wall defines a clean water portion and a used water portion. A clean water chamber is positioned in the container and releasably holds clean water therein. A water releasing unit is mounted on the container and is in fluid communication with the clean water chamber and the clean water portion. When actuated, the water releasing unit releases water from the clean water chamber into the clean water portion. A strainer is mounted on the container.

15 Claims, 6 Drawing Sheets

CLEANING BUCKET ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98.

The disclosure and prior art relates to water holding devices and more particularly pertains to a new water holding device for keeping clean water and used water separate.

BRIEF SUMMARY OF THE INVENTION

An embodiment of the disclosure meets the needs presented above by generally comprising a container that has a bottom wall and a peripheral wall that is attached to and extends upwardly from the bottom wall. The peripheral wall includes a forward wall, a rear wall, a first lateral wall, a second lateral wall. The container also includes a dividing wall that is attached to the bottom wall and extends from the forward wall to the rear wall. The dividing wall defines a clean water portion and a used water portion. A clean water chamber is positioned in the container and is configured to releasably hold clean water therein. A water releasing unit is mounted on the container. The water releasing unit is in fluid communication with the clean water chamber and the clean water portion of the container. The water releasing unit is actuated to release water from the clean water chamber into the clean water portion of the container. A strainer is mounted on the container.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
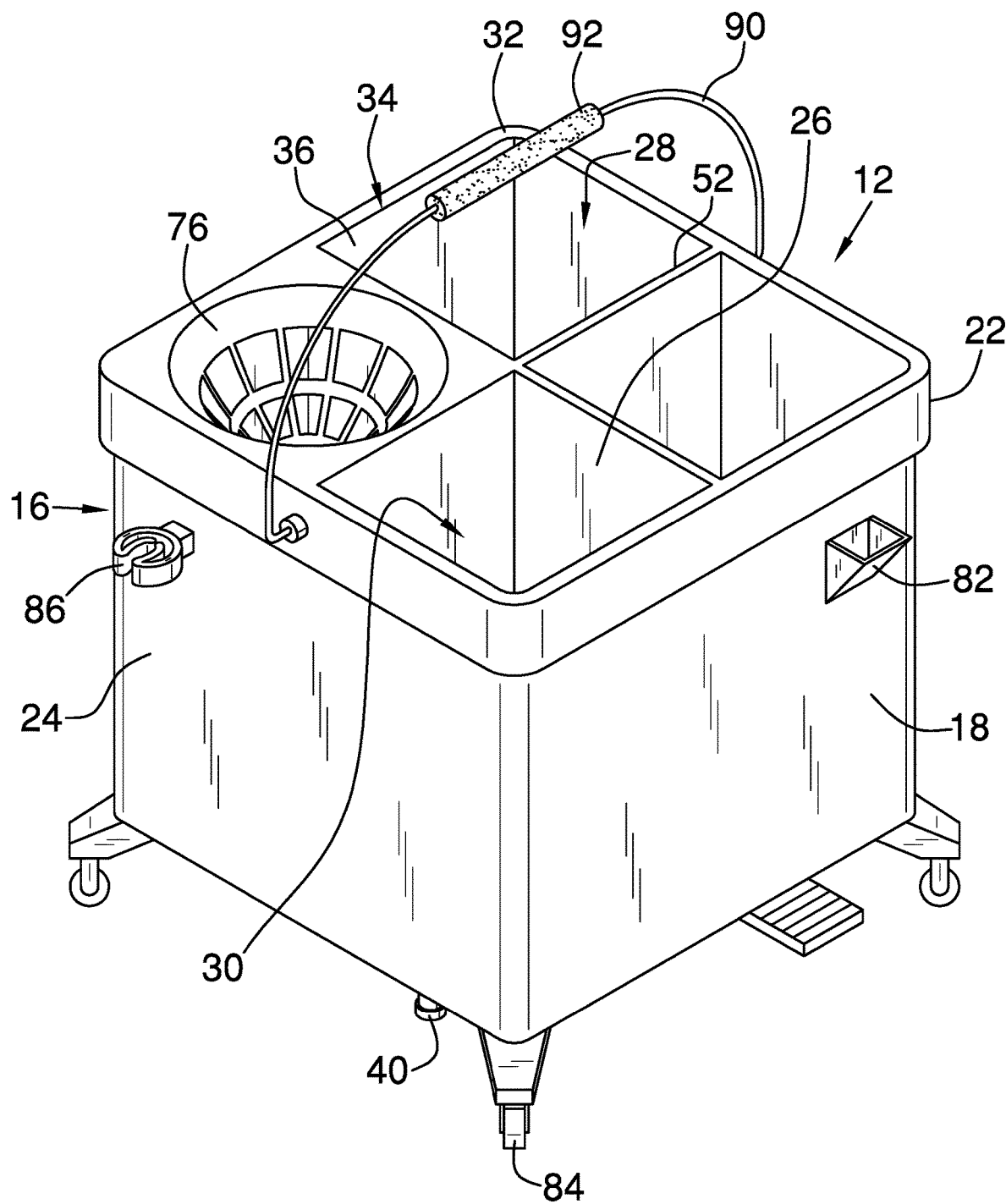
FIG. 1 is a top side view of a cleaning bucket assembly according to an embodiment of the disclosure.
Figure 2:
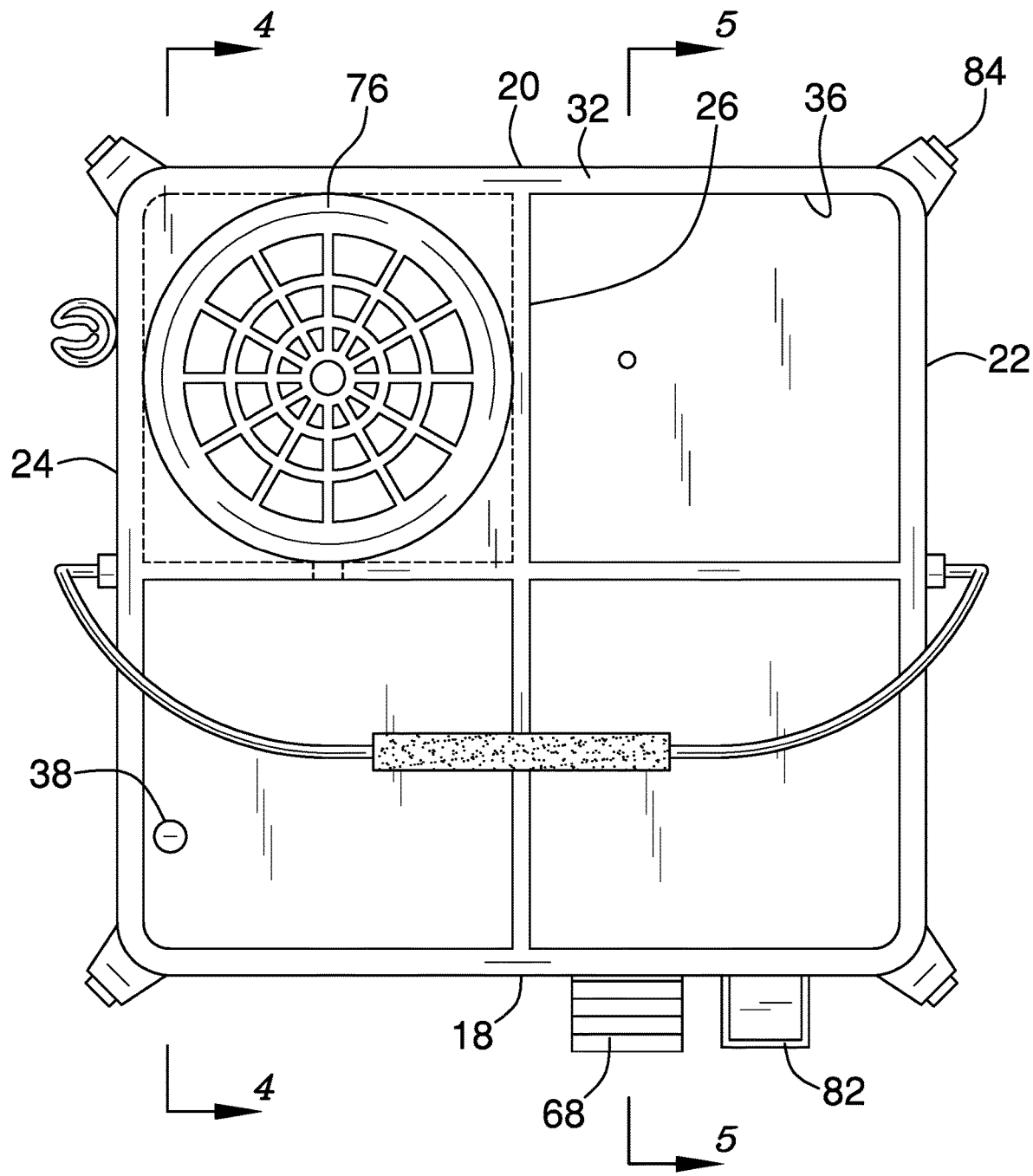
FIG. 2 is a top view of an embodiment of the disclosure.
Figure 3:
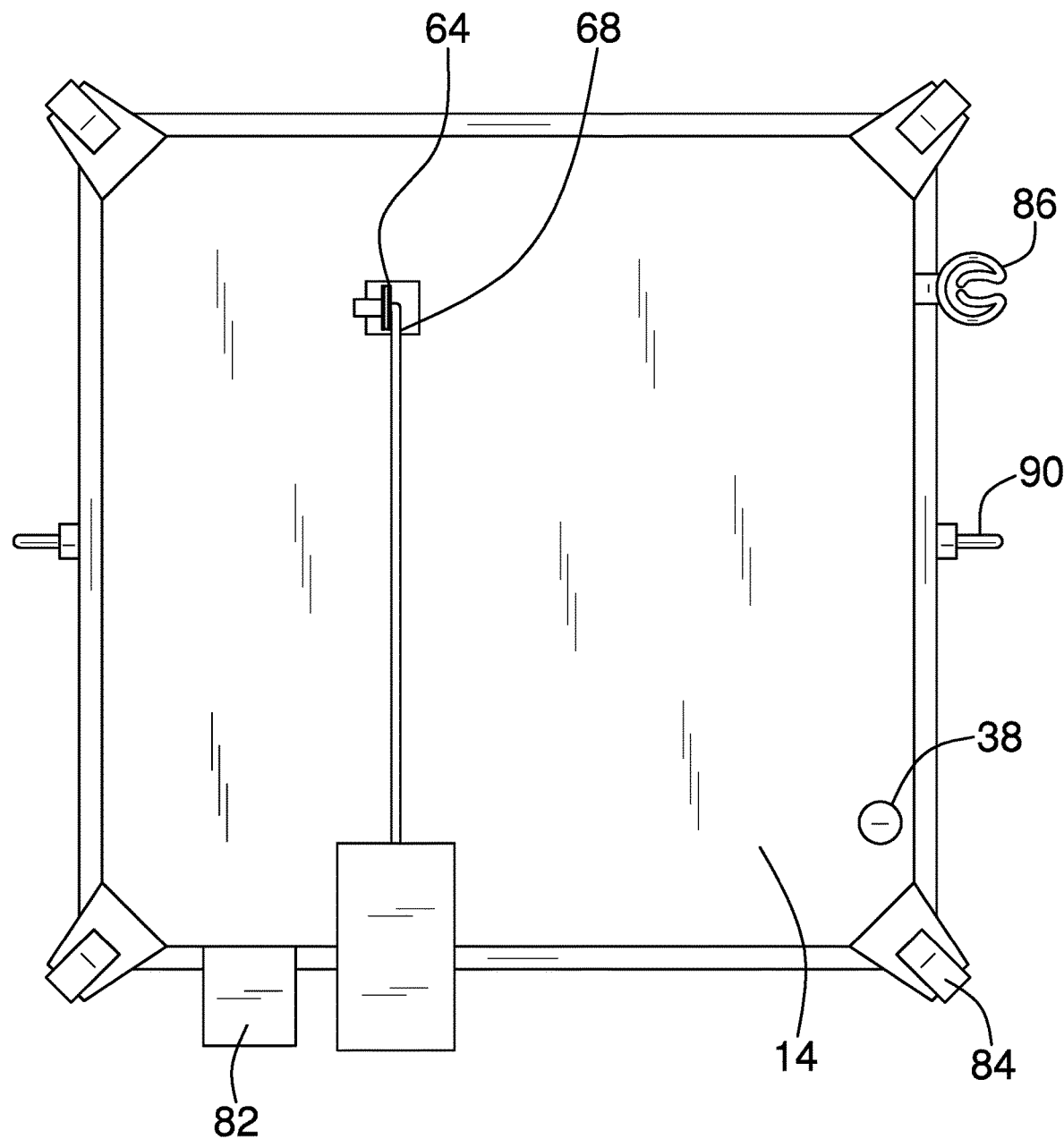
FIG. 3 is a bottom view of an embodiment of the disclosure.
Figure 4:
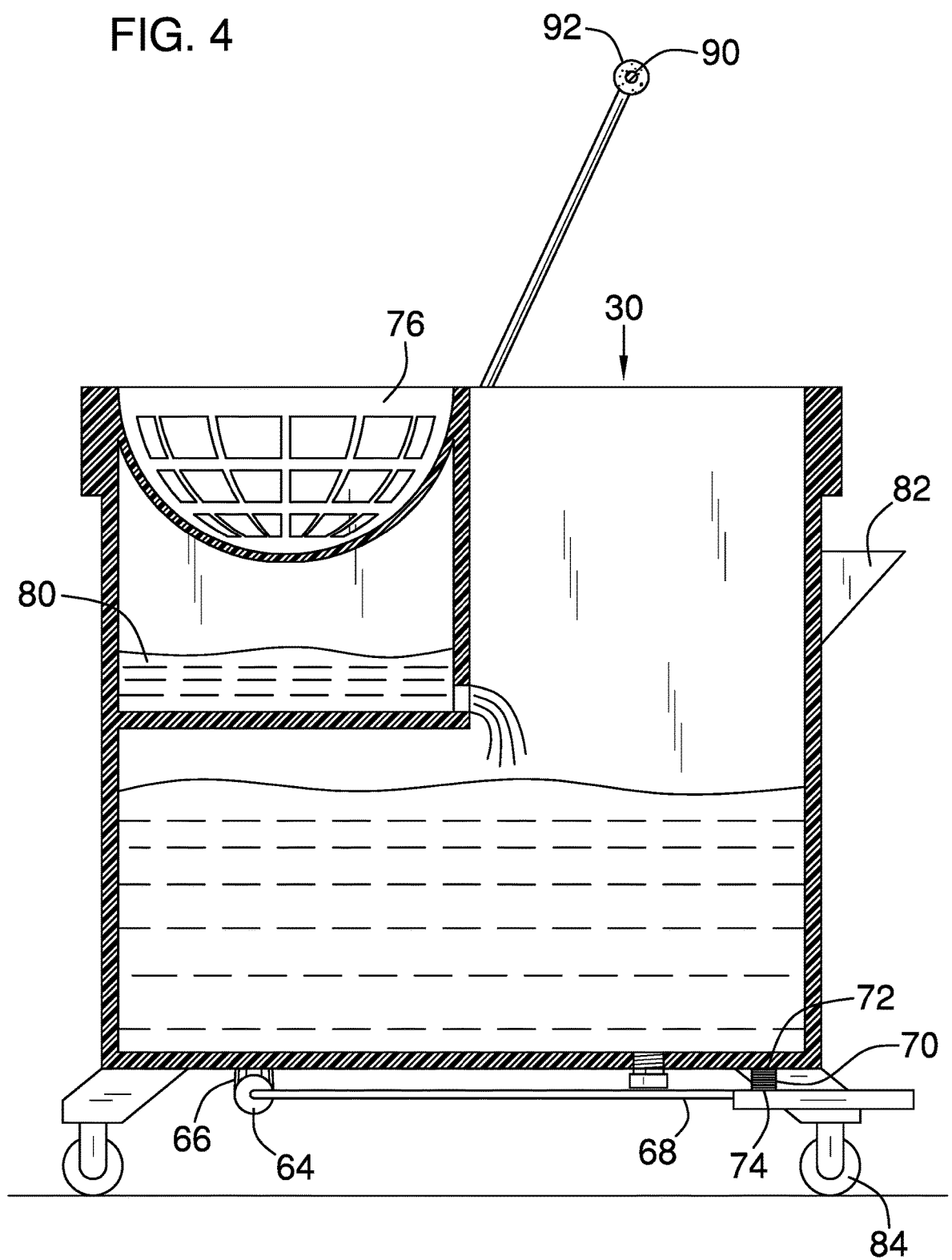
FIG. 4 is a cross-sectional view of an embodiment of the disclosure taken along line 4-4 of FIG. 2.
Figure 5:
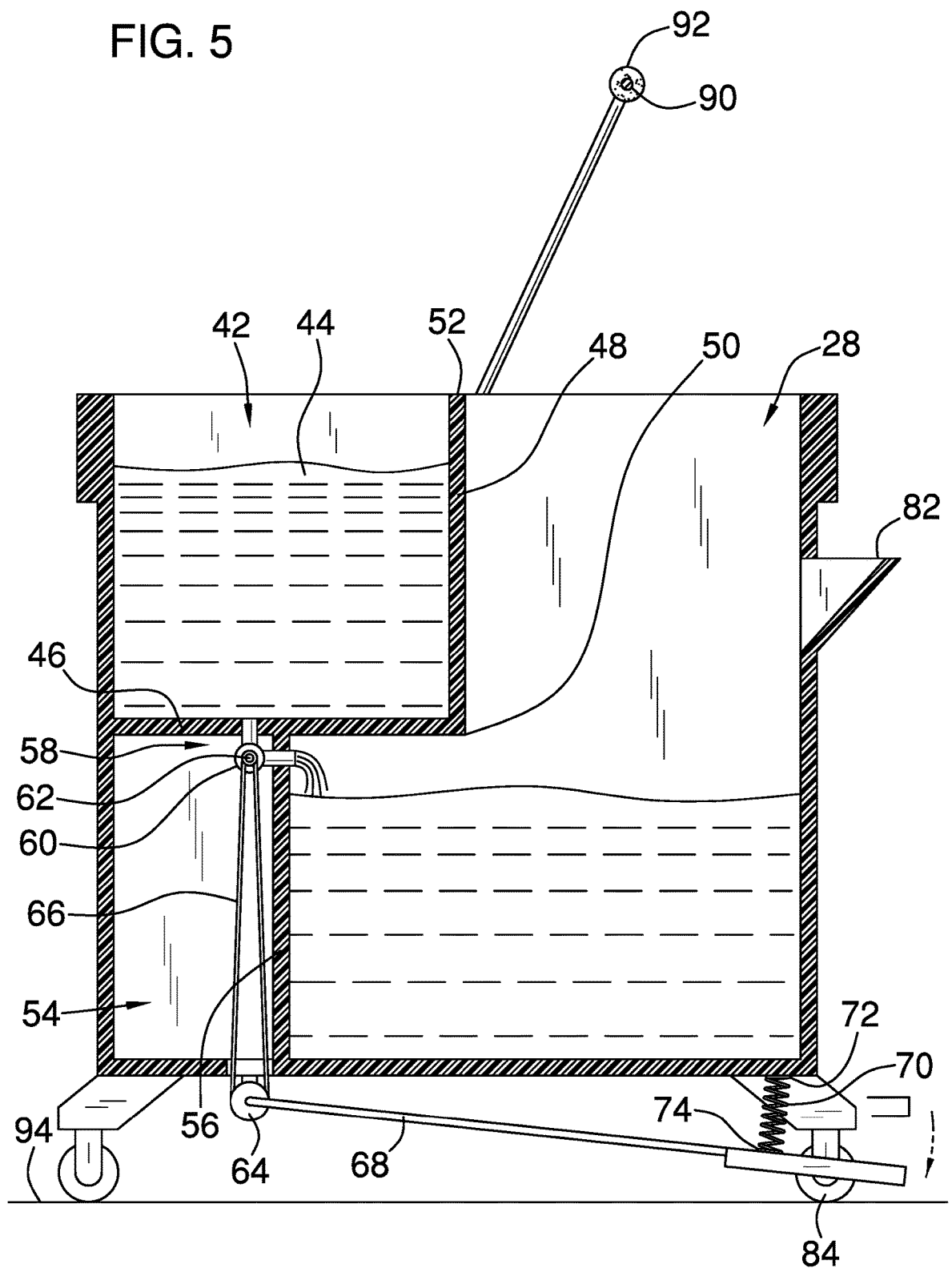
FIG. 5 is a cross-sectional view of an embodiment of the disclosure taken along line 5-5 of FIG. 2.
Figure 6:
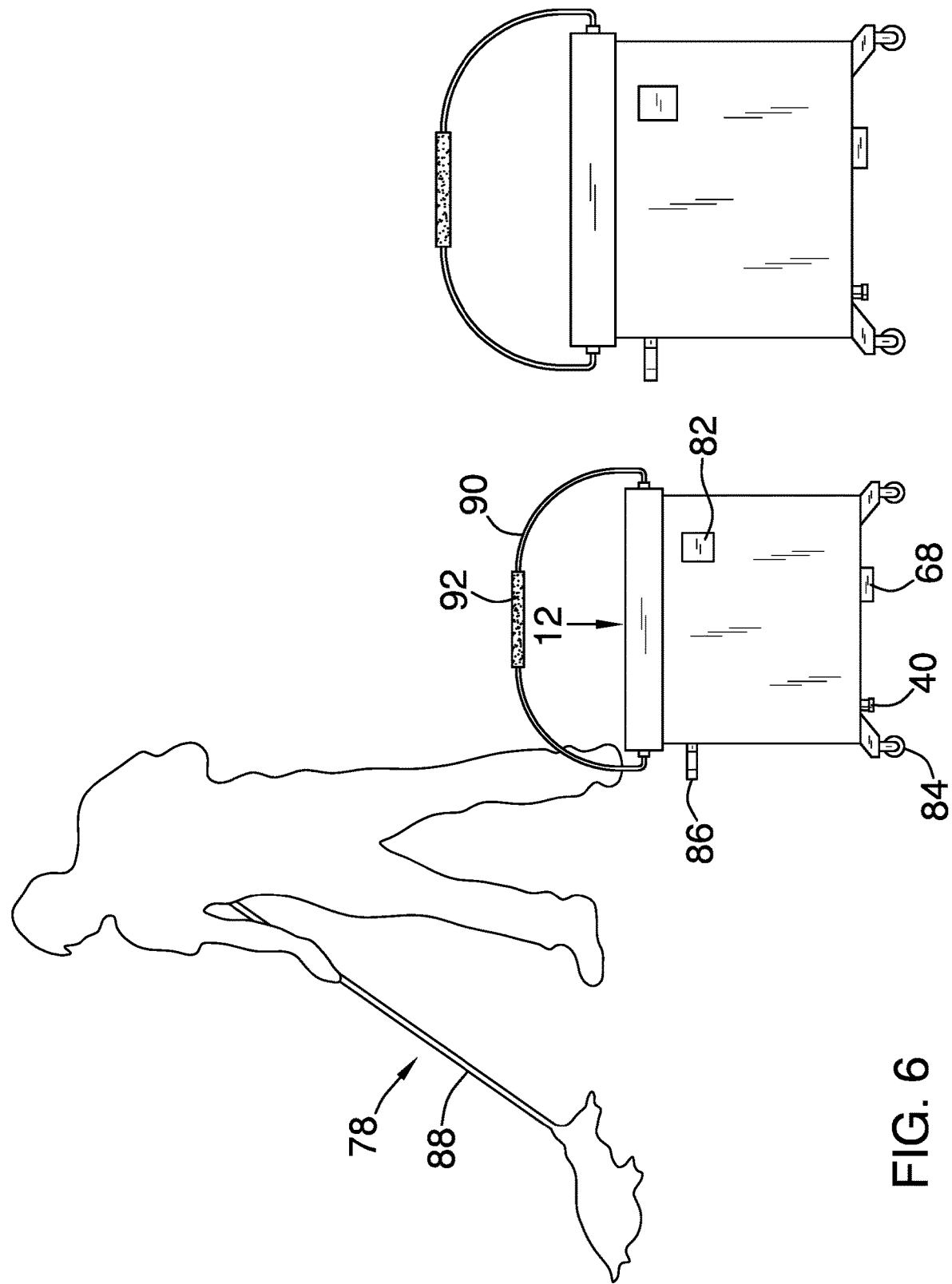
FIG. 6 is a front view of an embodiment of the disclosure.

With reference now to the drawings, and in particular to FIGS. 1 through 6 thereof, a new water holding device embodying the principles and concepts of an embodiment of the disclosure and generally designated by the reference numeral 10 will be described.

As best illustrated in FIGS. 1 through 6, the cleaning bucket assembly 10 generally comprises a container 12 that has a bottom wall 14 and a peripheral wall 16 that is attached to and extends upwardly from the bottom wall 14. The peripheral wall 16 includes a forward wall 18, a rear wall 20, a first lateral wall 22, and a second lateral wall 24. The container 12 also includes a dividing wall 26 that is attached to the bottom wall 14 and extends from the forward wall 18 to the rear wall 20. The dividing wall 26 defines a clean water portion 28 and a used water portion 30. An upper edge 32 of the peripheral wall 16 defines an opening 34 into an interior 36 of the used water portion 30 and the clean water portion 28. The container 12 has a drain aperture 38 that extends into the interior 36 of the used water portion 30. A plug 40 releasably closes the drain aperture 38.

A clean water chamber 42 is positioned in the container 12. The clean water chamber 42 releasably holds clean water 44 therein. The clean water chamber 42 has a first wall 46 and a second wall 48. The first wall 46 extends from the forward wall 18 toward the rear wall 20 and is parallel to the bottom wall 14. The first wall 18 is spaced from the bottom wall 14 and has a distal end 50 relative to the forward wall 18. The second wall 48 extends upwardly from the distal end 50 of the first wall 46. An upper edge 52 of the second wall 48 is coextensive with the upper edge 32 of the peripheral wall 16. The upper edge 52 of the second wall 48 defines an opening 34 into the clean water chamber 42.

A housing 54 is mounted in the container 12 and is defined by an inner wall 56 that is attached to and extends between the first wall 46 of the clean water chamber 42 and the bottom wall 14 of the container 12. The inner wall 56 extends from the first lateral wall 22 to the dividing wall 26 such that the housing 54 is positioned between the forward wall 18, the inner wall 56, the first lateral wall 22, the dividing wall 26, the first wall 46 and the bottom wall 14.

A water releasing unit 58 is mounted on the container 12. The water releasing unit 58 is in fluid communication with the clean water chamber 42 and the clean water portion 28 of the container 12. The water releasing unit 58 is actuated to release clean water 44 from the clean water chamber 42 into the clean water portion 28 of the container 28.

In one embodiment of the disclosure the water releasing unit 58 may be comprised of a release valve 60 that is positioned in the housing 54. The release valve 60 is fluidly coupled to the clean water chamber 42 and the clean water portion 28 of the container 12. The release valve 60 has an open condition and a closed condition wherein in the open condition the clean water 44 flows from the clean water chamber 42 through the release valve 60 and into the clean water portion 28.

A first wheel 62 is positioned on and is mechanically coupled to the release valve 60. The first wheel 62 is rotated in a first direction to actuate the release valve 60 into the open condition. The first wheel 62 is rotated in a second direction to actuate the release valve 60 into the closed condition. A second wheel 64 is rotatably coupled to and positioned outwardly of the bottom wall 14 of the container 12. A strap 66 is mechanically coupled to and extends between the first wheel 62 and the second wheel 64 such that when the second wheel 64 is rotated in a first direction the first wheel 62 rotates in the first direction and when the second wheel 64 rotates in the second direction the first wheel 62 rotates in the second direction.

A rod 68 is mechanically coupled to and extends away from the second wheel 64. The rod 68 extends outwardly from the rear wall 20 of the container 12. The rod 68 is pushed downwardly to rotate the first wheel 62 in the first direction. The rod 68 is pushed upwardly to rotate the first wheel 62 in the second direction. A biasing member 70 has a first end 72 and a second end 74. The first end 72 is attached to the bottom wall 14 of the container 12. The second end 74 is attached to the rod 68 such that the biasing member 70 biases the rod 68 upwardly toward the container 12. The biasing member 70 may comprise a spring but does not necessarily to be so.

A strainer 76 is mounted on the container 12. The strainer 76 is positioned adjacent to the upper edge 32 and positioned over the used water portion 30 to be in fluid communication with the used water portion 30. The strainer 76 receives a mop 78 wherein the mop 78 engages the strainer 76 to release used water 80 from the mop 78 such that the used water 80 flows into the used water portion 30.

An intake trough 82 is positioned on the container 12 and is in fluid communication with the clean water portion 28. A plurality of rollers 84 is rotatably attached to and extends downwardly from the container 12. A mount 86 is attached to the container 12 and releasably engages a handle 88 of a mop 78. The mount 86 may comprise a U-shaped clip but may be any mount 86 capable of securing the handle 88 of the mop 76 to the container 12. A handle 90 is attached to the container 12. The handle is pivotally coupled to the peripheral wall 16 and extends upwardly therefrom. A grip 92 is positioned on the handle 90. The grip 92 comprises a resiliently compressible material.

In use, the clean water chamber 42 is filled with clean water 44. The water releasing unit 58 is actuated to selectively release clean water 44 from the clean water chamber 42 into the clean water portion 28. The intake trough 82 receives a cleaning agent such that the cleaning agent goes through the intake trough 82 into the clean water portion 28. The mop 78 is dipped into the clean water portion 28 and is used to clean a floor surface 94. The mop 78 is then placed into the strainer 76 to engage the strainer 76 and release the used water 80 into the used water portion 30. The mop 76 is dipped back into the clean water portion 28 to absorb clean water 44 and facilitate cleaning the floor surface 94.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mop bucket assembly comprising:
   a container having a bottom wall and a peripheral wall being attached to and extending upwardly from said bottom wall, said peripheral wall including a forward wall, a rear wall, a first lateral wall, a second lateral wall, said container having a dividing wall being attached to said bottom wall and extending from said forward wall to said rear wall, said dividing wall defining a clean water portion and a used water portion;
   a clean water chamber being positioned in said container, said clean water chamber being configured to releasably hold clean water therein;
   a water releasing unit being mounted on said container, said water releasing unit being in fluid communication with said clean water chamber and said clean water portion of said container, said water releasing unit being actuated to release water from said clean water chamber into said clean water portion of said container; and
   a strainer being mounted on said container.

2. The mop bucket assembly according to claim 1, wherein an upper edge of said peripheral wall defines an opening into an interior of said used water portion and said clean water portion.

3. The mop bucket assembly according to claim 2, wherein said container has a drain aperture extending into said interior of said used water portion.

4. The mop bucket assembly according to claim 3, further including a plug releasably closing said drain aperture.

5. The mop bucket assembly according to claim 1, wherein said clean water chamber has a first wall and a second wall, said first wall extending from said forward wall toward said rear wall and being parallel to said bottom wall, said first wall being spaced from said bottom wall, said first wall having a distal end relative to said forward wall.

6. The mop bucket assembly according to claim 5, wherein said second wall extends upwardly from said distal end of said first wall, an upper edge of said second wall being coextensive with said upper edge of said peripheral wall, said upper edge of said second wall defining an opening into said clean water chamber.

7. The mop bucket assembly according to claim 6, further including a housing being mounted in said container, said housing being defined by an inner wall being attached to and extending between said first wall of said clean water chamber and said bottom wall of said container.

8. The mop bucket assembly according to claim 7, wherein said inner wall extends from said first lateral wall to said dividing wall such that said housing is positioned between said forward wall, said inner wall, said first lateral wall, said dividing wall, said first wall and said bottom wall.

9. The mop bucket assembly according to claim 1, wherein said strainer is positioned adjacent to said upper edge and positioned over said used water portion to be in fluid communication with said used water portion, said strainer being configured to receive a mop wherein the mop engages said strainer to release used water from the mop that that the used water flows into said used water portion.

10. The mop bucket assembly according to claim 1, wherein an intake trough is positioned on said container and being in fluid communication with said clean water portion.

11. The mop bucket assembly according to claim 1, further including a plurality of rollers being rotatably attached to and extending downwardly from said container.

12. The mop bucket assembly according to claim 1, further including a mount being attached to said container and being configured to releasably engage a handle of a mop, said mount comprising a U-shaped clip.

13. The mop bucket assembly according to claim 1, further including a handle being attached to said container, said handle being pivotally coupled to said peripheral wall and extending upwardly therefrom.

14. The mop bucket assembly according to claim 1, further including a grip being positioned on said handle, said grip comprising a resiliently compressible material.

15. A mop bucket assembly comprising:
- a container having a bottom wall and a peripheral wall being attached to and extending upwardly from said bottom wall, said peripheral wall including a forward wall, a rear wall, a first lateral wall, a second lateral wall, said container having a dividing wall being attached to said bottom wall and extending from said forward wall to said rear wall, said dividing wall defining a clean water portion and a used water portion, an upper edge of said peripheral wall defining an opening into an interior of said used water portion and said clean water portion, said container having a drain aperture extending into said interior of said used water portion;
- a plug releasably closing said drain aperture;
- a clean water chamber being positioned in said container, said clean water chamber being configured to releasably hold clean water therein, said clean water chamber having a first wall and a second wall, said first wall extending from said forward wall toward said rear wall and being parallel to said bottom wall, said first wall being spaced from said bottom wall, said first wall having a distal end relative to said forward wall, said second wall extending upwardly from said distal end of said first wall, an upper edge of said second wall being coextensive with said upper edge of said peripheral wall, said upper edge of said second wall defining an opening into said clean water chamber;
- a housing being mounted in said container, said housing being defined by an inner wall being attached to and extending between said first wall of said clean water chamber and said bottom wall of said container, said inner wall extending from said first lateral wall to said dividing wall such that said housing is positioned between said forward wall, said inner wall, said first lateral wall, said dividing wall, said first wall and said bottom wall;
- a water releasing unit being mounted on said container, said water releasing unit being in fluid communication with said clean water chamber and said clean water portion of said container, said water releasing unit being actuated to release water from said clean water chamber into said clean water portion of said container;
- a strainer being mounted on said container, said strainer being positioned adjacent to said upper edge and positioned over said used water portion to be in fluid communication with said used water portion, said strainer being configured to receive a mop wherein the mop engages said strainer to release used water from the mop that that the used water flows into said used water portion;
- an intake trough being positioned on said container and being in fluid communication with said clean water portion;
- a plurality of rollers being rotatably attached to and extending downwardly from said container;
- a mount being attached to said container and being configured to releasably engage a handle of a mop, said mount comprising a U-shaped clip;
- a handle being attached to said container, said handle being pivotally coupled to said peripheral wall and extending upwardly therefrom; and
- a grip being positioned on said handle, said grip comprising a resiliently compressible material.

* * * * *